United States Patent
Peng et al.

(10) Patent No.: US 9,391,526 B2
(45) Date of Patent: Jul. 12, 2016

(54) POWER SUPPLY APPARATUS WITH AUXILIARY WINDING SWITCHING CIRCUIT

(71) Applicant: Chicony Power Technology Co., Ltd., New Taipei (TW)

(72) Inventors: Tso-Jen Peng, New Taipei (TW); Ssu-Hao Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 134 days.

(21) Appl. No.: 14/523,294

(22) Filed: Oct. 24, 2014

(65) Prior Publication Data

US 2016/0118898 A1   Apr. 28, 2016

(51) Int. Cl.
*H02M 3/335* (2006.01)

(52) U.S. Cl.
CPC .................................. *H02M 3/33507* (2013.01)

(58) Field of Classification Search
CPC ...... H02M 3/33507; H02M 1/32; H02H 3/08; H02H 3/087; H02H 3/0852; H02H 3/093; H02H 3/10; H02H 3/105
USPC ........ 363/15–28, 50, 55, 56.01, 56.05, 56.06, 363/56.08, 56.09, 56.11
See application file for complete search history.

(56) References Cited

U.S. PATENT DOCUMENTS

2003/0123265 A1* 7/2003 Uchida ................... H02M 1/32
  363/21.12
2006/0239041 A1* 10/2006 Schonleitner ..... H02M 3/33507
  363/21.07

\* cited by examiner

*Primary Examiner* — Adolf Berhane
*Assistant Examiner* — Alex Torres-Rivera
(74) *Attorney, Agent, or Firm* — Muncy, Geissler, Olds & Lowe, P.C.

(57) ABSTRACT

A power supply apparatus includes a main converter, an auxiliary winding switching circuit and a pulse width modulation controller. The main converter includes a transformer. The transformer includes a primary side winding, a secondary side winding and an auxiliary winding. The auxiliary winding includes a first winding and a second winding. According to a secondary side voltage, the first winding induces to generate a first voltage, and the second winding induces to generate a second voltage. The first voltage is greater than the second voltage. The auxiliary winding switching circuit sends the first voltage to the pulse width modulation controller when the first voltage is not greater than a predetermined voltage. The auxiliary winding switching circuit sends the second voltage to the pulse width modulation controller when the first voltage is greater than the predetermined voltage.

10 Claims, 2 Drawing Sheets

POWER SUPPLY APPARATUS WITH AUXILIARY WINDING SWITCHING CIRCUIT

BACKGROUND OF THE INVENTION

1. Field of the Invention

The present invention relates to a power supply apparatus, and especially relates to a power supply apparatus with an auxiliary winding switching circuit.

2. Description of the Related Art

A power supply apparatus supplies power to an electronic apparatus to drive the electronic apparatus. The electronic apparatus informs the power supply apparatus of a required voltage (for examples, 5 volts or 19.5 volts) if the power supply apparatus supplies power through a universal serial bus interface.

The power supply apparatus comprises a transformer and a pulse width modulation controller. The transformer comprises a primary side winding, an auxiliary winding and a secondary side winding. The pulse width modulation controller is configured to change a voltage of the primary side winding when the electronic apparatus informs the power supply apparatus of the required voltage. The secondary side winding induces the voltage of the primary side winding to generate a voltage to send to the electronic apparatus. At the same time, the auxiliary winding induces the voltage of secondary side winding to generate a voltage to send to the pulse width modulation controller to supply power to the pulse width modulation controller.

When the required voltage is 5 volts, the voltage generated by the auxiliary winding is not too high, so that the pulse width modulation controller can utilize the voltage generated by the auxiliary winding directly. When the required voltage is 19.5 volts, the voltage generated by the auxiliary winding is too high, so that the pulse width modulation controller cannot utilize the voltage generated by the auxiliary winding directly. In an embodiment, the voltage generated by the auxiliary winding is 20 volts when the required voltage is 5 volts. The voltage generated by the auxiliary winding is 78 volts when the required voltage is 19.5 volts.

A regulating circuit is arranged to decrease the voltage generated by the auxiliary winding to protect the pulse width modulation controller when the voltage generated by the auxiliary winding is too high. However, the energy dissipation of the power supply apparatus is increased when the voltage generated by the auxiliary winding is decreased by the regulating circuit.

SUMMARY OF THE INVENTION

In order to solve the above-mentioned problems, an object of the present invention is to provide a power supply apparatus.

In order to achieve the object of the present invention mentioned above, the power supply apparatus comprises a main converter, an auxiliary winding switching circuit and a pulse width modulation controller. The auxiliary winding switching circuit is electrically connected to the main converter. The pulse width modulation controller is electrically connected to the main converter and the auxiliary winding switching circuit. The main converter comprises a transformer. The transformer comprises a primary side winding, a secondary side winding and an auxiliary winding. The auxiliary winding is electrically connected to the auxiliary winding switching circuit. The auxiliary winding comprises a first winding and a second winding. The first winding is electrically connected to the auxiliary winding switching circuit. The second winding is electrically connected to the auxiliary winding switching circuit and the first winding. The pulse width modulation controller is configured to change a primary side voltage of the primary side winding. According to the primary side voltage, the secondary side winding induces to generate a secondary side voltage. According to the secondary side voltage, the first winding induces to generate a first voltage. According to the secondary side voltage, the second winding induces to generate a second voltage. A turn number of the first winding is greater than a turn number of the second winding, so that the first voltage is greater than the second voltage. The auxiliary winding switching circuit sends the first voltage to the pulse width modulation controller to drive the pulse width modulation controller when the first voltage is not greater than a predetermined voltage. The auxiliary winding switching circuit sends the second voltage to the pulse width modulation controller to drive the pulse width modulation controller when the first voltage is greater than the predetermined voltage.

The advantage of the present invention is to decrease the energy dissipation of the power supply apparatus and protect the pulse width modulation controller.

DETAILED DESCRIPTION OF THE INVENTION

Figure 1:
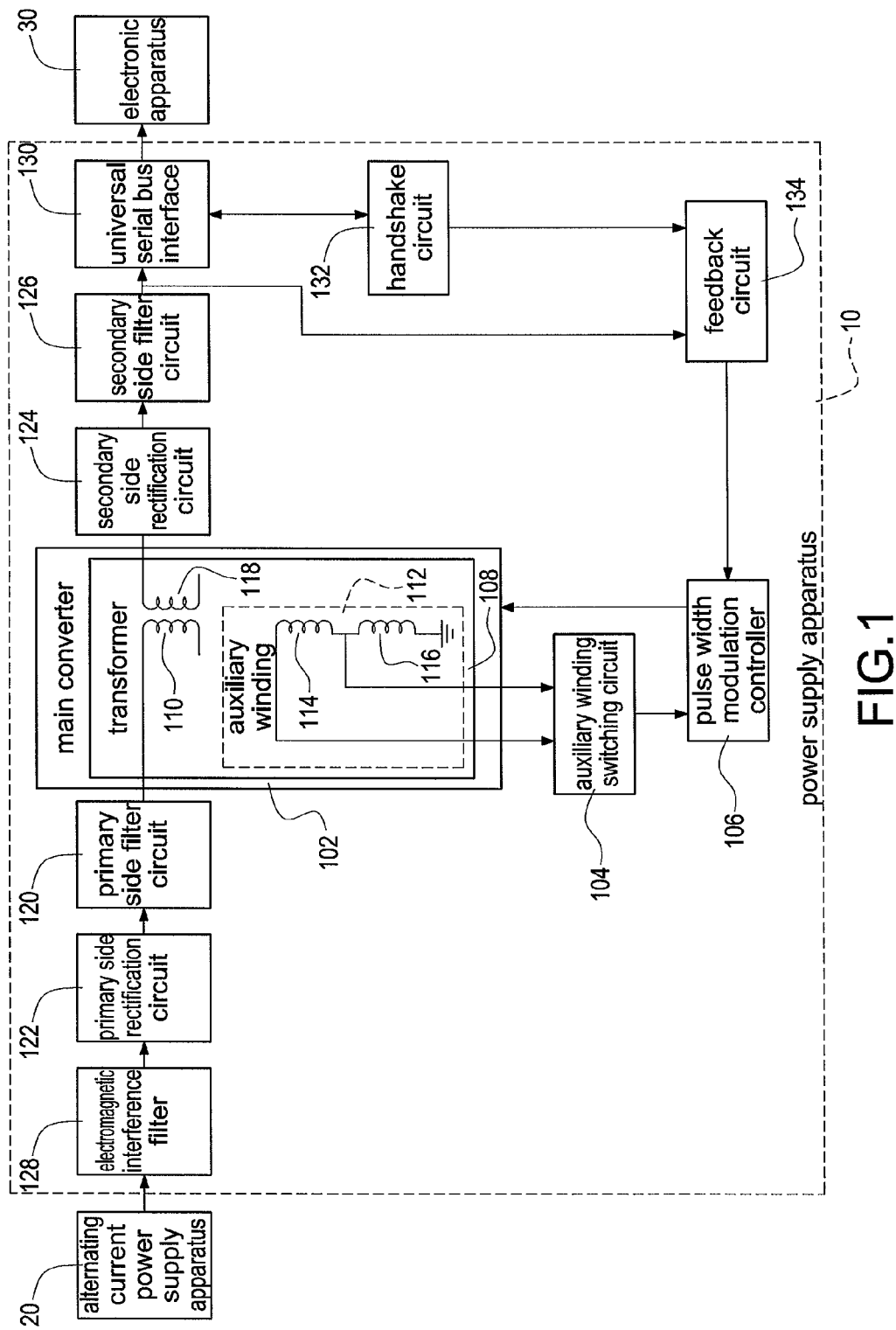
FIG. 1 shows a block diagram of the power supply apparatus of the present invention.

FIG. 1 shows a block diagram of the power supply apparatus of the present invention. A power supply apparatus 10 is applied to an alternating current power supply apparatus 20 and an electronic apparatus 30.

The power supply apparatus 10 comprises a main converter 102, an auxiliary winding switching circuit 104, a pulse width modulation controller 106, a primary side filter circuit 120, a primary side rectification circuit 122, a secondary side rectification circuit 124, a secondary side filter circuit 126, an electromagnetic interference filter 128, a universal serial bus interface 130, a handshake circuit 132 and a feedback circuit 134.

The main converter 102 comprises a transformer 108. The transformer 108 comprises a primary side winding 110, an auxiliary winding 112 and a secondary side winding 118. The auxiliary winding 112 comprises a first winding 114 and a second winding 116.

The auxiliary winding switching circuit 104 is electrically connected to the main converter 102. The pulse width modulation controller 106 is electrically connected to the main converter 102 and the auxiliary winding switching circuit 104. The auxiliary winding 112 is electrically connected to the auxiliary winding switching circuit 104. The first winding 114 is electrically connected to the auxiliary winding switching circuit 104. The second winding 116 is electrically connected to the auxiliary winding switching circuit 104 and the first winding 114.

The primary side filter circuit 120 is electrically connected to the primary side winding 110. The primary side rectification circuit 122 is electrically connected to the primary side filter circuit 120. The secondary side rectification circuit 124 is electrically connected to the secondary side winding 118. The secondary side filter circuit 126 is electrically connected to the secondary side rectification circuit 124. The electromagnetic interference filter 128 is electrically connected to the primary side rectification circuit 122 and the alternating current power supply apparatus 20. The universal serial bus interface 130 is electrically connected to the secondary side filter circuit 126 and the electronic apparatus 30. The handshake circuit 132 is electrically connected to the universal serial bus interface 130. The feedback circuit 134 is electrically connected to the handshake circuit 132, the secondary side filter circuit 126, the universal serial bus interface 130 and the pulse width modulation controller 106.

Figure 2:
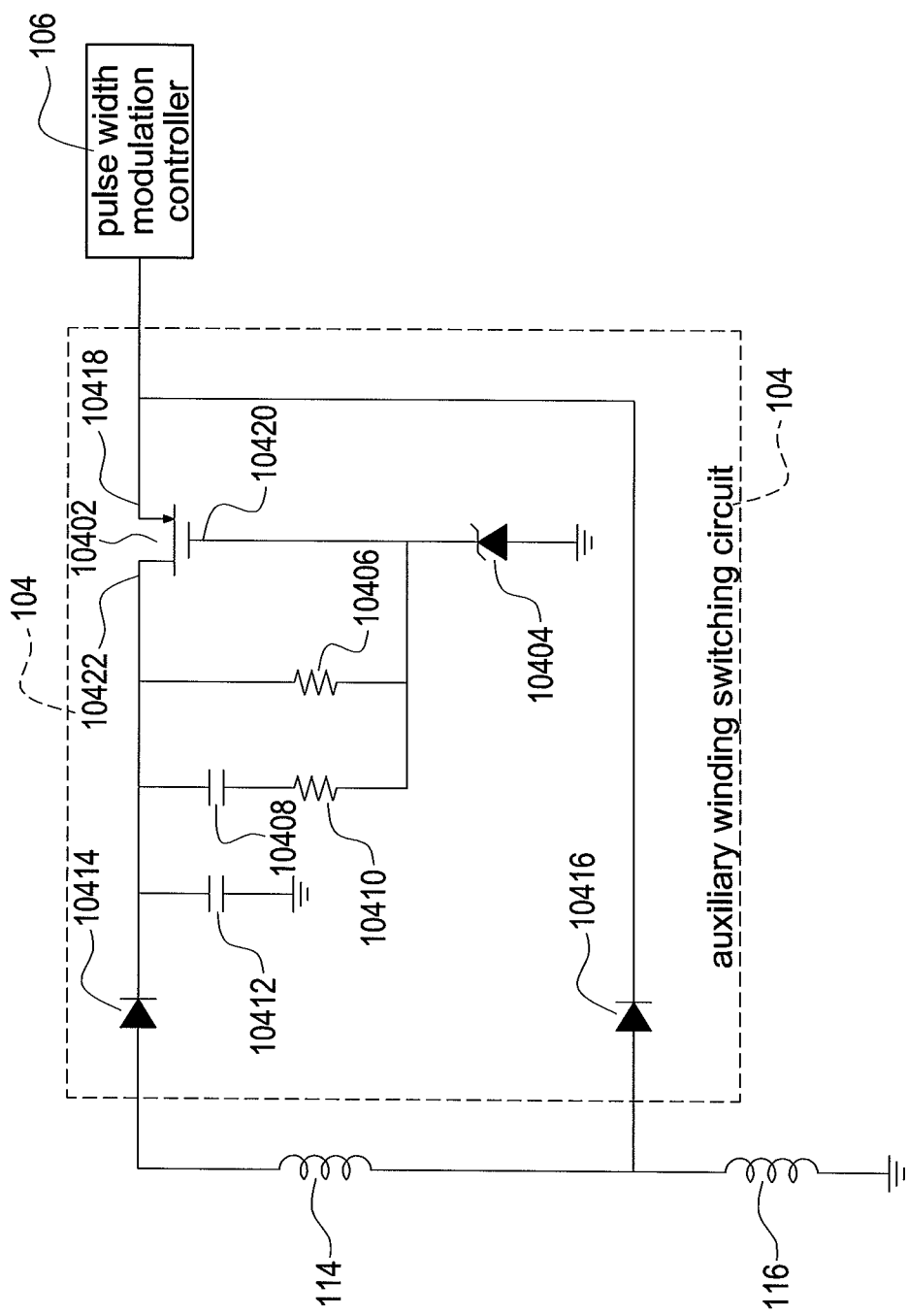
FIG. 2 shows a circuit diagram of an embodiment of the auxiliary winding switching circuit of the present invention.

FIG. 2 shows a circuit diagram of an embodiment of the auxiliary winding switching circuit of the present invention. The auxiliary winding switching circuit 104 comprises a metal oxide semiconductor field effect transistor 10402, a Zener diode 10404, a first resistor 10406, a first capacitor 10408, a second resistor 10410, a second capacitor 104012, a first diode 10414 and a second diode 10416.

The metal oxide semiconductor field effect transistor 10402 is electrically connected to the pulse width modulation controller 106. The Zener diode 10404 is electrically connected to the metal oxide semiconductor field effect transistor 10402. The first resistor 10406 is electrically connected to the metal oxide semiconductor field effect transistor 10402. The first capacitor 10408 is electrically connected to the metal oxide semiconductor field effect transistor 10402. The second resistor 10410 is electrically connected to the first capacitor 10408. The second capacitor 10412 is electrically connected to the metal oxide semiconductor field effect transistor 10402. The first diode 10414 is electrically connected to the metal oxide semiconductor field effect transistor 10402 and the first winding 114. The second diode 10416 is electrically connected to the metal oxide semiconductor field effect transistor 10402, the pulse width modulation controller 106 and the second winding 116.

In another word, the metal oxide semiconductor field effect transistor 10402 comprises a source 10418, a gate 10420 and a drain 10422. The source 10418 is connected to the pulse width modulation controller 106. A cathode of the Zener diode 10404 is connected to the gate 10420. An anode of the Zener diode 10404 is connected to ground. One side of the first resistor 10406 is connected to the drain 10422. The other side of the first resistor 10406 is connected to the gate 10420. One side of the first capacitor 10408 is connected to the drain 10422.

One side of the second resistor 10410 is connected to the other side of the first capacitor 10408. The other side of the second resistor 10410 is connected to the gate 10420. One side of the second capacitor 10412 is connected to the drain 10422. The other side of the second capacitor 10412 is connected to ground. A cathode of the first diode 10414 is connected to the drain 10422. An anode of the first diode 10414 is connected to one side of the first winding 114. A cathode of the second diode 10416 is connected to the source 10418. An anode of the second diode 10416 is connected to the other side of the first winding 114 and one side of the second winding 116. The other side of the second winding 116 is connected to ground.

Please refer to FIG. 1 and FIG. 2 at the same time. The electronic apparatus 30 informs the pulse width modulation controller 106 of a required voltage (for examples, 5 volts or 19.5 volts) through the universal serial bus interface 130, the handshake circuit 132 and the feedback circuit 134. Therefore, the pulse width modulation controller 106 is configured to change a primary side voltage of the primary side winding 110. Moreover, the main converter 102 is a flyback converter. The pulse width modulation controller 106 changing the primary side voltage of the primary side winding 110 is a conventional art, so that it is not described here for brevity.

According to the primary side voltage, the secondary side winding 118 induces to generate a secondary side voltage. According to the secondary side voltage, the first winding 114 induces to generate a first voltage. According to the secondary side voltage, the second winding 116 induces to generate a second voltage. A turn number of the first winding 114 is greater than a turn number of the second winding 116, so that the first voltage is greater than the second voltage.

The auxiliary winding switching circuit 104 sends the first voltage to the pulse width modulation controller 106 to drive the pulse width modulation controller 106 when the first voltage is not greater than a predetermined voltage. The auxiliary winding switching circuit 104 sends the second voltage to the pulse width modulation controller 106 to drive the pulse width modulation controller 106 when the first voltage is greater than the predetermined voltage.

Moreover, a breakdown voltage (for example, 18 volts) of the Zener diode 10404 is less than the predetermined voltage (for example, 20 volts). The metal oxide semiconductor field effect transistor 10402 is turned on when a voltage of the gate 10420 is greater than a voltage of the source 10418. The turn number of the first winding 114 is three times as the turn number of the second winding 116.

In an embodiment, the first voltage is 15 volts and the second voltage is 5 volts if the required voltage is 5 volts. The first voltage (15 volts) is not greater than the predetermined voltage (20 volts), so that the auxiliary winding switching circuit 104 sends the first voltage to the pulse width modulation controller 106 to drive the pulse width modulation controller 106.

Moreover, the second voltage (5 volts) is sent to the source 10418, and the first voltage (15 volts) is sent to the drain 10422. The metal oxide semiconductor field effect transistor 10402 is turned on, so that the auxiliary winding switching circuit 104 sends the first voltage (15 volts) to the pulse width modulation controller 106.

In another embodiment, the first voltage is 58.5 volts and the second voltage is 19.5 volts if the required voltage is 19.5 volts. The first voltage (58.5 volts) is greater than the predetermined voltage (20 volts), so that the auxiliary winding switching circuit 104 sends the second voltage (19.5 volts) to the pulse width modulation controller 106 to drive the pulse width modulation controller 106.

Moreover, the second voltage (19.5 volts) is sent to the source 10418, and the first voltage (58.5 volts) is sent to the drain 10422. The voltage of the gate 10420 is limited to be the breakdown voltage (for example, 18 volts) of the Zener diode 10404. The voltage of the gate 10420 (18 volts) is not greater than the voltage of the source 10418 (19.5 volts), so that the metal oxide semiconductor field effect transistor 10402 is turned off, and then the auxiliary winding switching circuit 104 sends the second voltage (19.5 volts) to the pulse width modulation controller 106.

Moreover, the metal oxide semiconductor field effect transistor 10402 mentioned above can be replace by a bipolar junction transistor to achieve the function of switching (being turned on or off).

The advantage of the present invention is to decrease the energy dissipation of the power supply apparatus and protect the pulse width modulation controller. The energy dissipation of the power supply apparatus 10 (comprising the auxiliary winding switching circuit 104) is less than the energy dissipation of the conventional power supply apparatus (comprising a regulating circuit).

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus comprising:
a main converter;
an auxiliary winding switching circuit electrically connected to the main converter; and
a pulse width modulation controller electrically connected to the main converter and the auxiliary winding switching circuit;
wherein the main converter comprises a transformer; the transformer comprises a primary side winding, a secondary side winding and an auxiliary winding; the auxiliary winding is electrically connected to the auxiliary winding switching circuit; the auxiliary winding comprises a first winding and a second winding; the first winding is electrically connected to the auxiliary winding switching circuit; the second winding is electrically connected to the auxiliary winding switching circuit and the first winding;
wherein the pulse width modulation controller is configured to change a primary side voltage of the primary side winding; according to the primary side voltage, the secondary side winding induces to generate a secondary side voltage; according to the secondary side voltage, the first winding induces to generate a first voltage; according to the secondary side voltage, the second winding induces to generate a second voltage; a turn number of the first winding is greater than a turn number of the second winding, so that the first voltage is greater than the second voltage;
wherein the auxiliary winding switching circuit sends the first voltage to the pulse width modulation controller to drive the pulse width modulation controller when the first voltage is not greater than a predetermined voltage; the auxiliary winding switching circuit sends only the second voltage to the pulse width modulation controller to drive the pulse width modulation controller when the first voltage is greater than the predetermined voltage.

2. The power supply apparatus in claim 1, wherein the auxiliary winding switching circuit comprises:
a metal oxide semiconductor field effect transistor electrically connected to the pulse width modulation controller; and
a zener diode electrically connected to the metal oxide semiconductor field effect transistor.

3. The power supply apparatus in claim 2, wherein the auxiliary winding switching circuit further comprises:
a first resistor electrically connected to the metal oxide semiconductor field effect transistor;
a first capacitor electrically connected to the metal oxide semiconductor field effect transistor; and
a second resistor electrically connected to the first capacitor.

4. The power supply apparatus in claim 3, wherein the auxiliary winding switching circuit further comprises:
a second capacitor electrically connected to the metal oxide semiconductor field effect transistor;
a first diode electrically connected to the metal oxide semiconductor field effect transistor and the first winding; and
a second diode electrically connected to the metal oxide semiconductor field effect transistor, the pulse width modulation controller and the second winding.

5. The power supply apparatus in claim 4, further comprising:
a primary side filter circuit electrically connected to the primary side winding; and
a primary side rectification circuit electrically connected to the primary side filter circuit.

6. The power supply apparatus in claim 5, further comprising:
a secondary side rectification circuit electrically connected to the secondary side winding; and
a secondary side filter circuit electrically connected to the secondary side rectification circuit.

7. The power supply apparatus in claim 6, the power supply apparatus applied to an alternating current power supply apparatus and an electronic apparatus, the power supply apparatus further comprising:
an electromagnetic interference filter electrically connected to the primary side rectification circuit and the alternating current power supply apparatus.

8. The power supply apparatus in claim 7, further comprising:
a universal serial bus interface electrically connected to the secondary side filter circuit and the electronic apparatus.

9. The power supply apparatus in claim 8, further comprising:
a handshake circuit electrically connected to the universal serial bus interface.

10. The power supply apparatus in claim 9, further comprising:
a feedback circuit electrically connected to the handshake circuit, the secondary side filter circuit, the universal serial bus interface and the pulse width modulation controller.

* * * * *